United States Patent
Spencer

(10) Patent No.: US 6,789,406 B2
(45) Date of Patent: Sep. 14, 2004

(54) METHODS OF FORMING ANGLED ORIFICES IN AN ORIFICE PLATE

(75) Inventor: Dale Stewart Spencer, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 4 days.

(21) Appl. No.: 10/097,387

(22) Filed: Mar. 15, 2002

(65) Prior Publication Data
US 2003/0172708 A1 Sep. 18, 2003

(51) Int. Cl.$^7$ ............................................ B21D 28/26
(52) U.S. Cl. .................. 72/335; 29/890.142; 29/896.6; 29/557; 219/149
(58) Field of Search ................. 72/335, 334; 29/896.6, 29/896.62, 890.142, 890.143, 557, 558; 219/149

(56) References Cited

U.S. PATENT DOCUMENTS

| | | | | |
|---|---|---|---|---|
| 1,785,071 A | * | 12/1930 | Coberly .................... 29/896.6 |
| 2,364,864 A | * | 12/1944 | Martin ..................... 29/890.12 |
| 2,737,831 A | | 3/1956 | Webb et al. .................. 76/107 |
| 2,843,927 A | | 7/1958 | Stock .......................... 29/545 |
| 3,370,508 A | * | 2/1968 | Iaia ............................. 409/132 |
| 3,434,327 A | | 3/1969 | Speakman .................... 72/377 |
| 3,457,954 A | * | 7/1969 | Nyberg ................... 137/625.28 |
| 4,545,231 A | | 10/1985 | Connolly et al. .............. 72/335 |
| 4,987,761 A | | 1/1991 | Saccoccio .................... 72/335 |
| 5,109,823 A | | 5/1992 | Yokoyama et al. .......... 123/472 |
| 5,239,751 A | * | 8/1993 | Kanamaru et al. ...... 29/890.142 |
| 5,263,353 A | | 11/1993 | Bakermans et al. ........... 72/334 |
| 5,626,295 A | | 5/1997 | Heyse et al. ................. 239/596 |
| 5,992,502 A | | 11/1999 | Blaimschein et al. ........ 164/476 |
| 6,018,976 A | | 2/2000 | Wolf ............................ 72/327 |
| 6,190,214 B1 | | 2/2001 | Bianca et al. ............... 439/751 |
| 6,209,381 B1 | | 4/2001 | Yaguchi et al. ............... 72/416 |

FOREIGN PATENT DOCUMENTS

| | | | | |
|---|---|---|---|---|
| FR | 2308440 | * | 11/1976 | |
| SU | 1278065 | * | 12/1986 | .................. 72/335 |

* cited by examiner

Primary Examiner—Daniel C. Crane

(57) ABSTRACT

Several methods of forming angled orifices in a metal sheet are described in which an angled orifice can be formed from a preformed right-angled orifice. Each angled orifice has an oblique axis relative to at least one of a first surface and a second surface of a metal sheet. One of the methods can be achieved by punching the metal sheet in a first direction along a first axis perpendicular to one of the first and second surfaces of the metal sheet with a first tool piece so as to form a first orifice, the first orifice defining an opening having wall surfaces parallel to the first axis; and punching the metal sheet with the first tool piece proximate the first orifice in the first direction along a second axis parallel and offset to the first axis so as to form a first wall surface of the first orifice extending between the first and second surfaces of the metal sheet oblique to the first axis. Another method can be used to form the right-angled orifice and the angled orifice sequentially using a single tool. Yet another method can be used to form the angled orifice simultaneously.

30 Claims, 6 Drawing Sheets

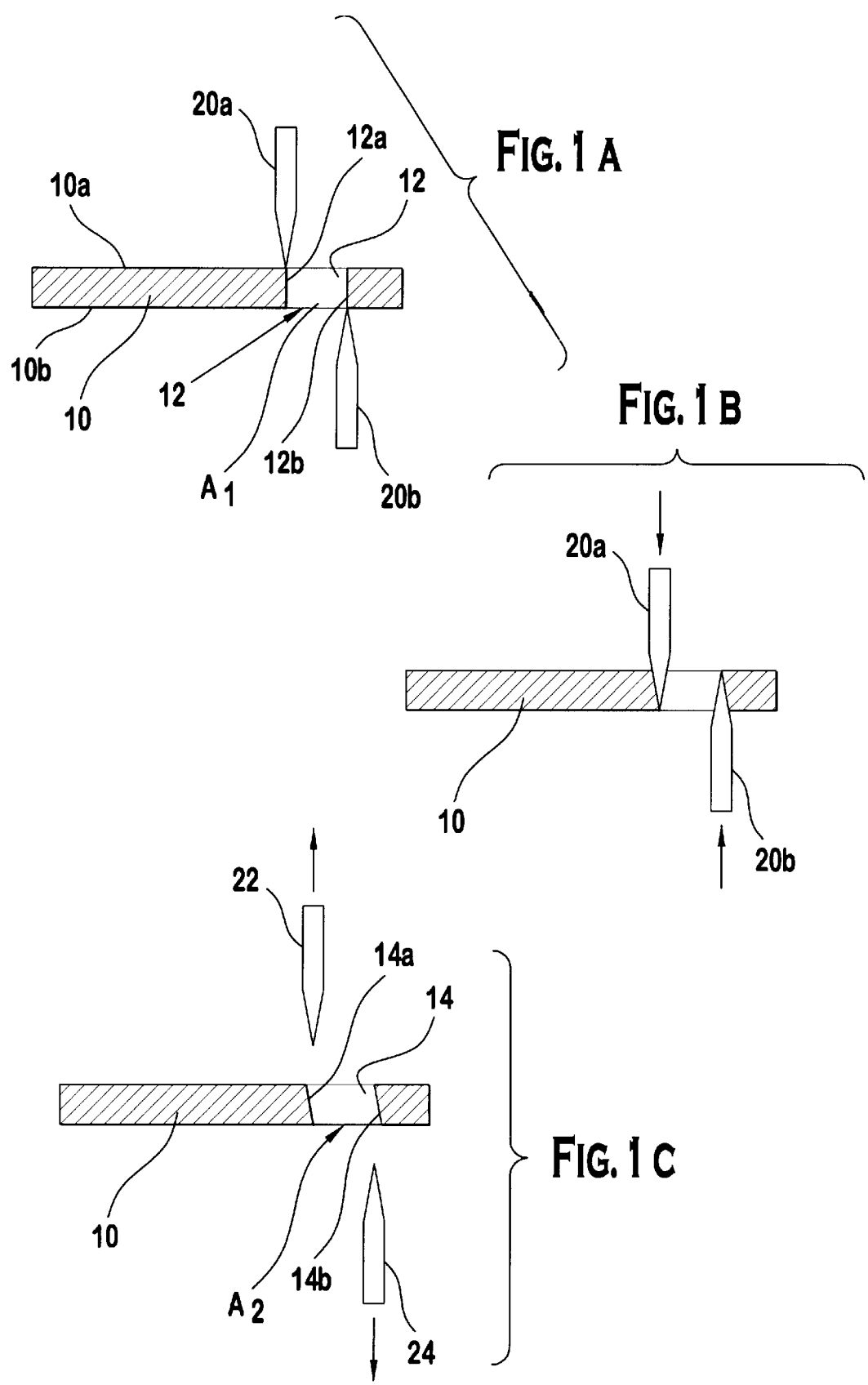

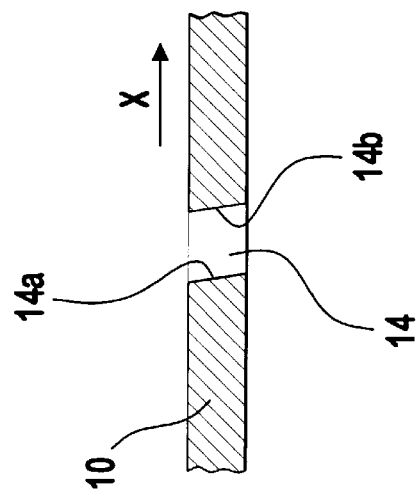
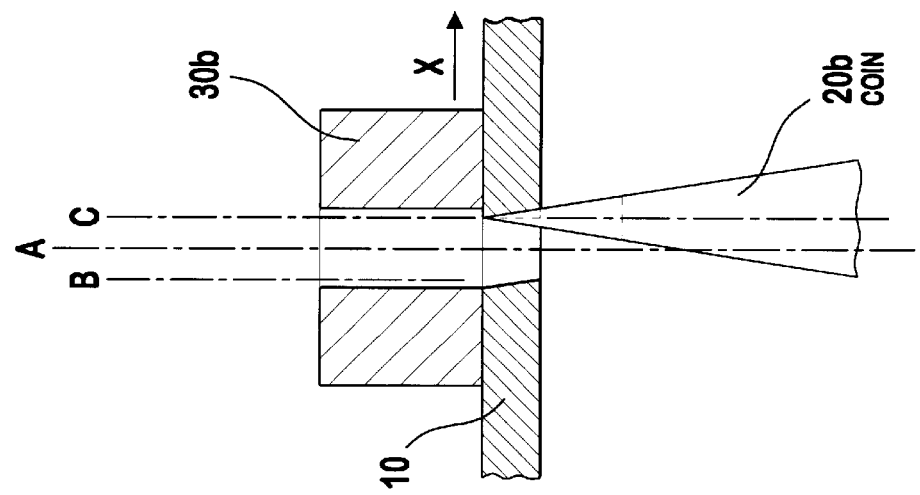
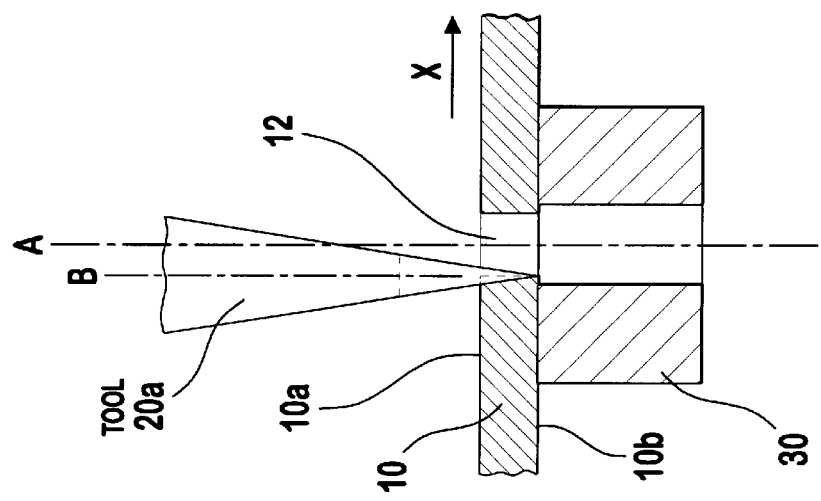

METHODS OF FORMING ANGLED ORIFICES IN AN ORIFICE PLATE

BACKGROUND OF THE INVENTION

Most modern automotive fuel systems utilize fuel injectors to provide precise metering of fuel for introduction into each combustion chamber. Additionally, the fuel injector atomizes the fuel during injection, breaking the fuel into a large number of very small particles, increasing the surface area of the fuel being injected, and allowing the oxidizer, typically ambient air, to more thoroughly mix with the fuel prior to combustion. The precise metering and atomization of the fuel reduces combustion emissions and increases the fuel efficiency of the engine.

An electro-magnetic fuel injector typically utilizes a solenoid assembly to supply an actuating force to a fuel-metering valve. Typically, the fuel metering valve is a plunger-style needle valve which reciprocates between a closed position, where the needle is seated in a valve seat to prevent fuel from escaping through a metering orifice into the combustion chamber, and an open position, where the needle is lifted from the valve seat, allowing fuel to discharge through the metering orifice for introduction into the combustion chamber.

Fuel flowing through a fuel injector typically exits at an outlet end of the fuel injector. The outlet end is believed to have a disk or plate with at least one orifice to control, in part, the spray pattern and the direction of the fuel exiting the fuel injector.

An orifice extending along an axis perpendicular to a surface of a work piece (i.e. a straight orifice) is believed to be formed by drilling or by punching through the work piece. One method of drilling is by electric discharge machining (EDM) that can form orifices of 150 to 200 microns in diameter. It is believed that one of the many disadvantages of EDM is the fact that the holes are typically formed without any favorable entry or exit geometry for the orifices, thereby affecting the flow through the orifices. Another method is by laser machining the orifices on the work piece or the plate. Yet another method can be by stamping or punching the orifices and then coining each edge of the orifice. However, it is believed that the orifices formed by these methods do not allow for spray targeting of the fuel as the fuel leaves the orifices of the injector.

In order to target the fuel spray, it is believed that orifices can be angled to a desired angle relative to a longitudinal axis of the fuel injector. Such angled orifices can be formed by any of the above methods, albeit at, it is believed, a much greater cost than a straight orifice. Another method utilizes dimpling a portion of the work piece on which a straight orifice has already been formed with a right circular cone. However, it is believed that such dimpled orifice plate increases a sac volume between the fuel injector closure tip and the orifice plate. This increased sac volume, during a non-injection event, causes fuel to remains in the sac that vaporizes and causes rich/lean shifts and hot start issues, which are undesirable.

SUMMARY OF THE INVENTION

Briefly, the present invention provides several methods of forming angled orifices in a workpiece with a plurality of angled orifices.

The present invention provides for one method of forming orifices in a metal sheet, each having an oblique axis relative to at least one of a first surface and a second surface of a metal sheet. In one preferred embodiment, the method can be achieved by punching the metal sheet in a first direction along a first axis perpendicular to one of the first and second surfaces of the metal sheet with a first tool piece so as to form a first orifice, the first orifice defining an opening having wall surfaces parallel to the first axis; and punching the metal sheet with the first tool piece proximate the first orifice in the first direction along a second axis parallel and offset to the first axis so as to form a first wall surface of the first orifice extending between the first and second surfaces of the metal sheet oblique to the first axis.

The present invention also provides for another method of forming a plurality of orifices for an orifice plate. The orifice plate has a first plate surface and a second plate surface spaced from the first plate surface. In a preferred embodiment, the method can be achieved by providing a first tool head, a second tool head, a plurality of orifices extending between the first and second plate surfaces of the plate along a longitudinal axis perpendicular to at least one of the first and second surfaces, each of the plurality of orifices having wall surfaces parallel to the longitudinal axis and intersecting the first and second plate surfaces so as to define an edge of the orifice; moving one of the first tool head and the plate in a first direction along the longitudinal axis into one of the first a second plate surfaces at a location proximate an edge of each of the plurality of orifices so as to cause a first portion of the wall surfaces to extend in a first oblique direction relative to the longitudinal axis; and moving the other of the second tool head and the plate in a second direction along the longitudinal axis into the other of the first and second plate surfaces at a location proximate an edge of each of the plurality of orifices so as to cause a second portion of the wall surfaces to extend in a second oblique direction relative to the longitudinal axis.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIGS. 1a–1c illustrate two punches and a work plate involved in the process of a preferred embodiment.

FIGS. 2a–2c illustrate two punches and a work plate in another preferred embodiment.

DETAILED DESCRIPTION OF THE PREFERRED EMBODIMENTS

Figure 3A:
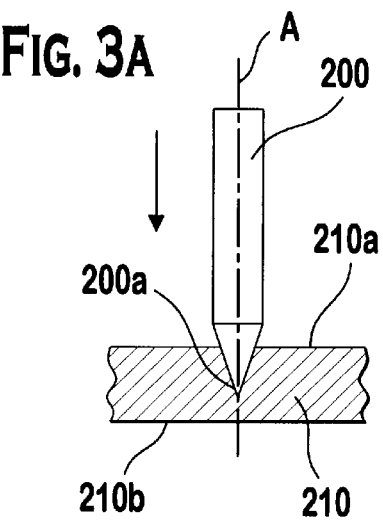
FIGS. 3a–3f illustrate a process of forming an orifice with a single punch according to yet another preferred embodiment.

FIGS. 1–5 illustrate the preferred embodiments. In particular, FIGS. 1a–1c illustrate a generally simultaneous formation of an angled orifice 14 from a right-angled orifice 12 for an orifice plate 10. FIGS. 2a–2c, on the other hand, illustrate a sequential formation of the angled orifice 14 from a right-angled orifice 12 for an orifice plate. As used herein, the term "orifice" denotes an "opening" that extends between a first surface 10a to a second surface 10b of a member, which preferably is a plate. The opening can be of a suitable cross-section, such as, for example, circular, oval, rectangular, square or polygonal. Preferably, the orifice has a circular opening with straight wall surfaces 12a and 12b (of orifice 12) and an oval opening subsequent to the formation of angled wall surfaces 14a and 14b (of orifice 14).

The orifice plate 10 can include a member of a suitable cross-section, such as, for example, a plate with a first surface 10a that can be linear and preferably parallel to a linear second surface 10b; a plate having non-parallel first surface 10a (which can be a substantially planar surface) to the second surface 10b (which can also be a substantially planar surface); or a plate with a first surface 10a that can be curvilinear and preferably parallel to a curvilinear second surface 10b. The orifice 10 can include a right-angled orifice 12 pre-formed thereon or the right-angled orifice 12 can be formed prior to the formation of the angled orifice 14. Preferably, the formations of the right-angled orifice can be done prior to the formation of an angled orifice. The right-angled orifice 12 can be formed by a suitable technique, such as, for example, electro-discharge-machining (EDM), laser drilling or by mechanical drilling/punching. The plate or metal sheet can be between approximately 0.003–0.010 inch in thickness. The plate can be any suitable material, such as, for example, metal, composite, monomer or polymer that deforms upon application of a compressive load. Preferably, the orifice plate 10 can be a stainless steel plate or sheet having linearly parallel first and second surfaces 10a and 10b separated by a distance of approximately 0.006 inch, which plate also has an orifice 12 preformed by a suitable technique such as, for example, by mechanical drilling, punching, laser drilling or by Electric Discharge Machining.

With reference to FIGS. 1a–1c, a generally simultaneous operation that forms an angled orifice 14 is preferably shown. Specifically, an orifice plate 10 can be provided with a preformed orifice 12 of a first predetermined cross-sectional area $A_1$ extending along a longitudinal axis A. The first cross-sectional area $A_1$ is referenced as an area generally transverse to the axis A on either surface 302a or 302b. A first punch tool 20a and a second punch tool 20b are placed on opposite sides of the plate 10 such that a longitudinal axis extending along each of the tool is substantially parallel to the longitudinal axis A. The first punch tool 20a can be provided with a first tip 22 having a suitable cross-section, such as, for example, a cone, a right triangle or a wedge. The second punch tool 20b can be provided with a second tip 24 having a suitable cross-section, such as, for example, a cone, a right triangle or a wedge. Preferably, the tips 22 and 24 are conic. Also desirably, the formation of the orifice 14 can be performed in sequence by the tool heads depending the speed of the press and size and progression of the die.

Each of the tips 22 and 24 can be aligned such that, as each tip is moved towards the orifice 12, the respective tip can be contiguous to a portion of the edge of the orifice 12 (FIGS. 1a and 3). As each tip is further moved in a direction along the axis A (FIG. 1b), the wall or orifice surfaces 12a and 12b are believed to be plastically deformed, resulting in a permanent deformation of the wall or orifice surfaces 10a and 10b (FIGS. 1c and 4b). Although the wall surfaces have been described as separate portions, it should be understood that each surface is part of an area defining the orifice. Each of the wall or orifice surfaces 12a and 12b can be deformed into respective wall or orifice surfaces 14a and 14b that are oblique with respect to the longitudinal axis, or at least one wall surface can be oblique to both the axis A and the other wall surface (FIG. 4b). Moreover, due to the punch tools, the walls surfaces 14a, 14b are deformed to a second predetermined cross-sectional area $A_2$ (as referenced generally transverse to axis A) of the orifice 14 where $A_2 > A_1$ of the area of the orifice 12. Furthermore, some materials from the wall or orifice surfaces 10a and 10b are removed while other materials of the wall or orifice surfaces are plastically deformed.

To insure that an appropriate amount of force can be transmitted to one of the tips so that each tip can plastically deform the wall or orifice surfaces of the orifice 12, it is preferable to have at least one tip moving relative to the other tip along the longitudinal axis at substantially same time so that the force transmitted to one of the tip can be supported by the other tip.

The formation of an angled orifice can be done in sequence in another preferred embodiment, shown here in FIGS. 2a–2c. Here, an orifice plate 10 can be again preferably provided with an orifice 12 having a right circular opening with extends generally along the longitudinal axis to form the surfaces of the orifice. One of the first and second surfaces 10a and 10b can be placed against first die busing 30a. The punch tool can be used to plastically deform the wall or orifice surfaces 10a or 10b from the other of the first and second surfaces 10a, 10b (FIGS. 2a and 2b) by moving the punch tool along a first axis B that can be parallel and offset to the axis A. This results in an orifice plate 10 having a wall surface 14a oriented in an oblique direction relative to the axis A. The plate 10 is then moved along a direction X. A second die bushing 30b can be placed against the other of the first and second surfaces 10a and 10b (i.e. surface 10a) while the second punch tool 20b can be moved along a second axis C parallel to and offset to axis A. This results in the orifice plate having a wall surface 14b oriented in an oblique direction relative to the longitudinal axis A or to the wall surface 14a.

Figure 3B:
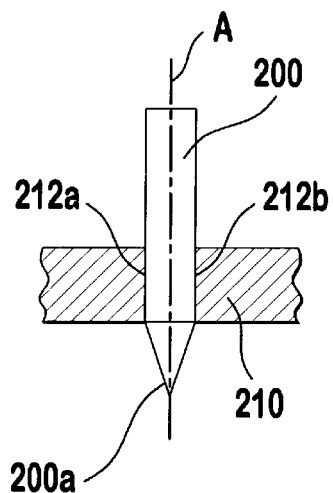
Figure 3C:
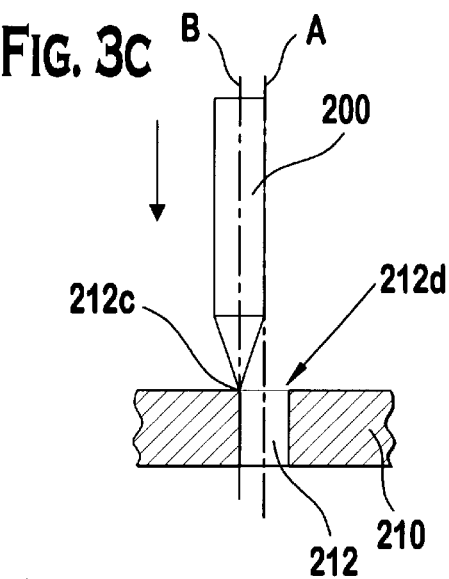
Figure 3D:
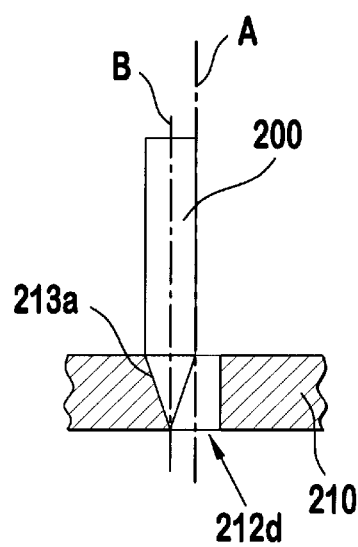
Figure 3E:
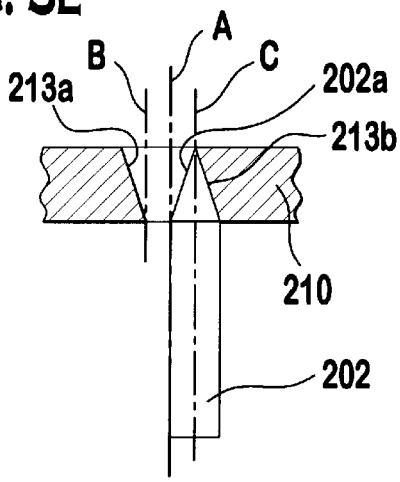
Figure 3F:
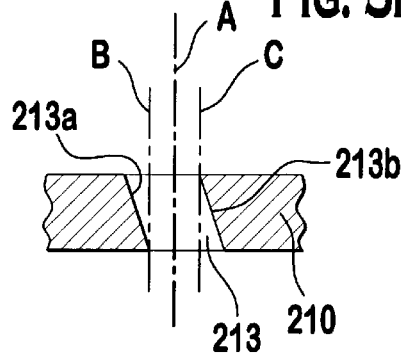

In another preferred embodiment, illustrated here by FIGS. 3a–3f, a first punch tool 200 can be used to punch, in a metal sheet 210, a first orifice 212 having wall or orifice surfaces 212a and 212b perpendicular to one of the first and second surfaces 210a and 210b of the metal sheet 210, which first punch tool can be used to deform the first surface 210a to a first oblique wall surface 211a of the orifice and a second punch tool 202 can be used to deform the second wall or orifice surfaces 210b to a second oblique wall surface 211b. Specifically, the first punch tool 200 can be moved in a first axis A that can be perpendicular to one of the first and second surfaces 210a and 210b (FIG. 3a). As the first punch tool moves through the metal sheet 210, an orifice 212 having parallel wall or orifice surfaces 212a and 212b are formed (FIG. 3b). The first punch tool can be withdrawn and can be preferably offset from the axis A by a predetermined distance such that a tip 200a can be generally contiguous to one of edges 212c and 212d formed between the surfaces 210a, 210b and the wall or orifice surfaces 212a and 212b (FIG. 3c). The first punch tool 200 is then moved along a second axis B, which axis B can be preferably parallel to the first axis A, and is also perpendicular to one of the surfaces 210a and 210b so as to plastically deform the first wall surface 212a to a first oblique wall surface 213a (FIG. 3d).

The second punch tool 202, which could be an identical punch tool to the first punch tool 200, can be aligned with a third axis C such that, preferably, a tip 202a, can be contiguous with the edge 212d of the orifice 212. The third axis C can be preferably parallel to and offset by a predetermined distance from the first axis A. As the punch tool 202 is moved along the axis C, the tip 202a plastically deforms the wall surface 212b of the orifice 212 so as to form a second oblique wall surface 213b. The first oblique wall surface 213a and the second oblique wall surface 213b are preferably parallel to each other and oblique with respect to the first axis A. It should be noted here that, instead of a second punch tool, the workpiece could be flipped 180 degrees such that the first punch tool can be used to also punch surface 210b. It should also be noted here that an area that can be formed by an opening of the oblique orifice 213 can be now greater than an area that can be formed by an opening of the orifice 212.

Figure 4A:
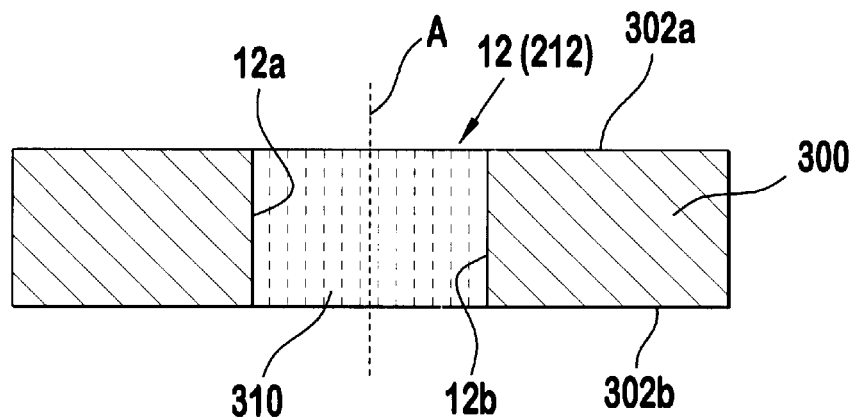
FIG. 4a illustrates a cross-sectional cutaway of an orifice plate with a straight orifice.
Figure 4B:
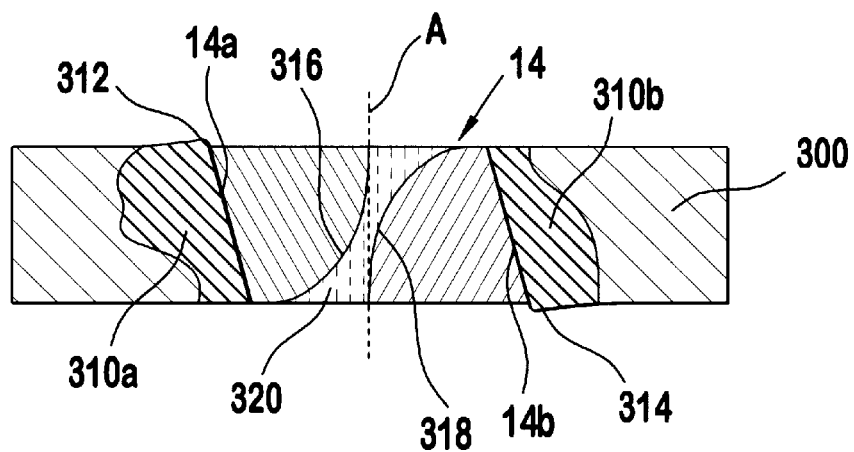
FIG. 4b illustrates a cross-sectional cutaway of an angled orifice with plastic deformations.
Figure 4C:
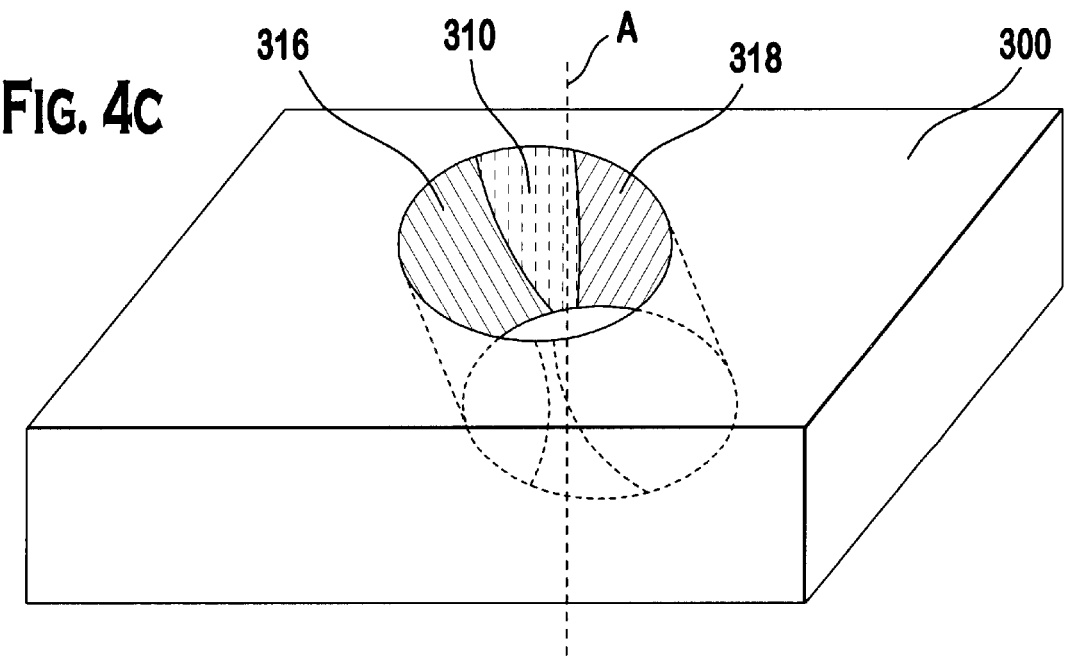
FIG. 4c illustrates an orthogonal view of the oblique orifice of FIG. 4b with exaggerated delineation of surface changes to due to the preferred embodiments.

As used herein, the term plastic deformation indicates that a material 300 of the orifice plate 10, specifically the orifice 12, can be deformed beyond the elastic limit, thereby resulting in a permanent deformation of the material in a surrounding area 310 (FIGS. 4a–4c). The permanently deformed material may provide a characteristic bulged or raised portion 312 or 314 of plastically deformed material bulging away from the planar surface near respective intersections between the orifice and the surfaces 302a or 302b of the orifice 14 or 213. Additionally, due to slippage of crystalline structures prevalent in the preferred material (stainless steel) of the orifice plate, the surrounding area 310 of the orifice 14 or 212 can be hardened by cold-working. Cold-worked metal results in new dislocations being produced when the metal is deformed. As the number of dislocations in the crystal change, they should become tangled or pinned and would not be able to move. This should strengthen the material near or surrounding the orifice plate, which should make the plate as whole harder to deform due to the cold working process. For the angled orifice 14 or 213, compressive stresses are beneficial in increasing resistance to fatigue failures, corrosion fatigue, stress corrosion cracking, hydrogen assisted cracking, fretting, galling and erosion caused by fluid flow cavitation. The orifice 14 or 213 may also benefit due to work hardening, intergranular corrosion resistance, surface texturing and closing of porosity in the metal. Also, the cold working, or expansion, of the orifice 14 or 213 creates compressive stress zones around the orifice. These compressive stress zones around the orifice 14 or 213 should provide an increase in hardness and improved fatigue resistance of the material that the orifice is made of. It should be noted that, in a suitable application, the cold-worked metal plate or metal sheet used to form the orifice disc can also be heat treated by a suitable heat treatment such as, for example, annealing, process-annealing, normalizing, patenting, spherodizing, or tempering for one or more purposes such as (1) to remove stresses; (2) to induce softness; (3) to alter ductility, toughness, electrical, magnetic or other physical properties; (4) to refine the crystalline structure; (5) to remove gases; or (6) to produce a desired micro-structure for the sheet metal or plate.

Figure 4D:
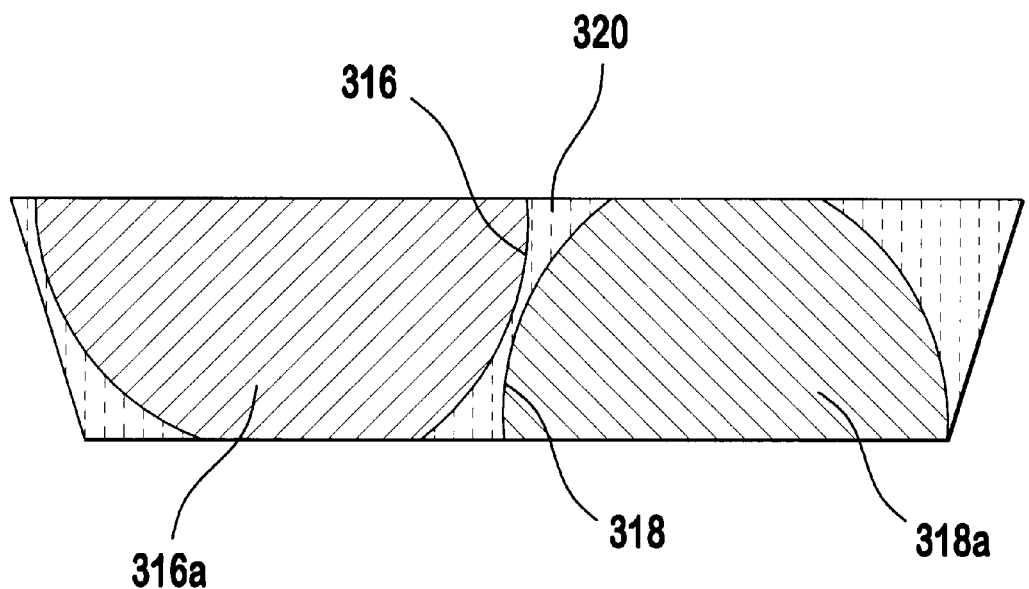
FIGS. 4d and 4e illustrate a virtual oblique orifice being unrolled from the orifice of FIGS. 4b–4c.
Figure 4E:
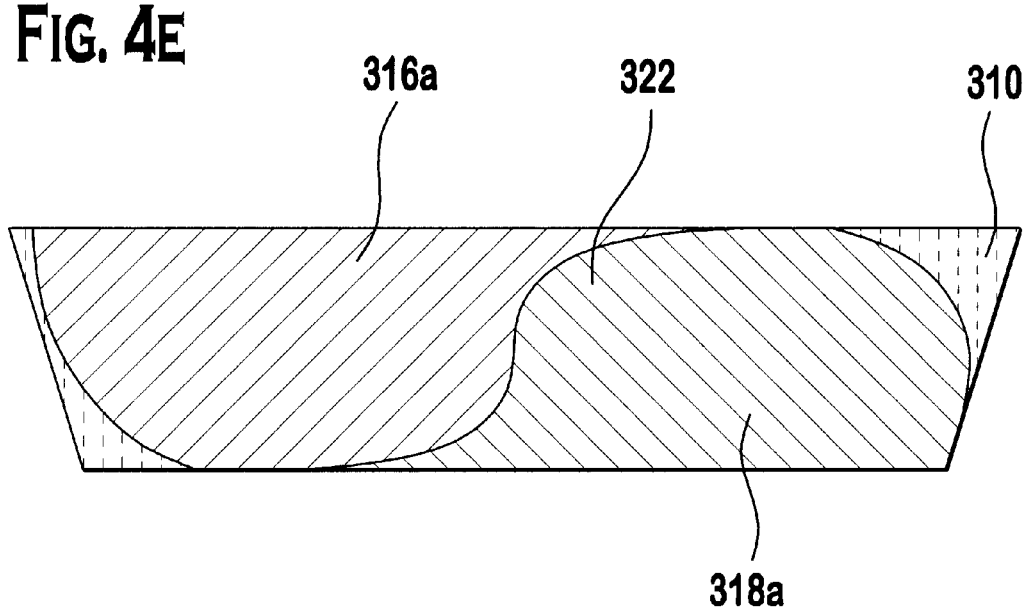
Figure 5:
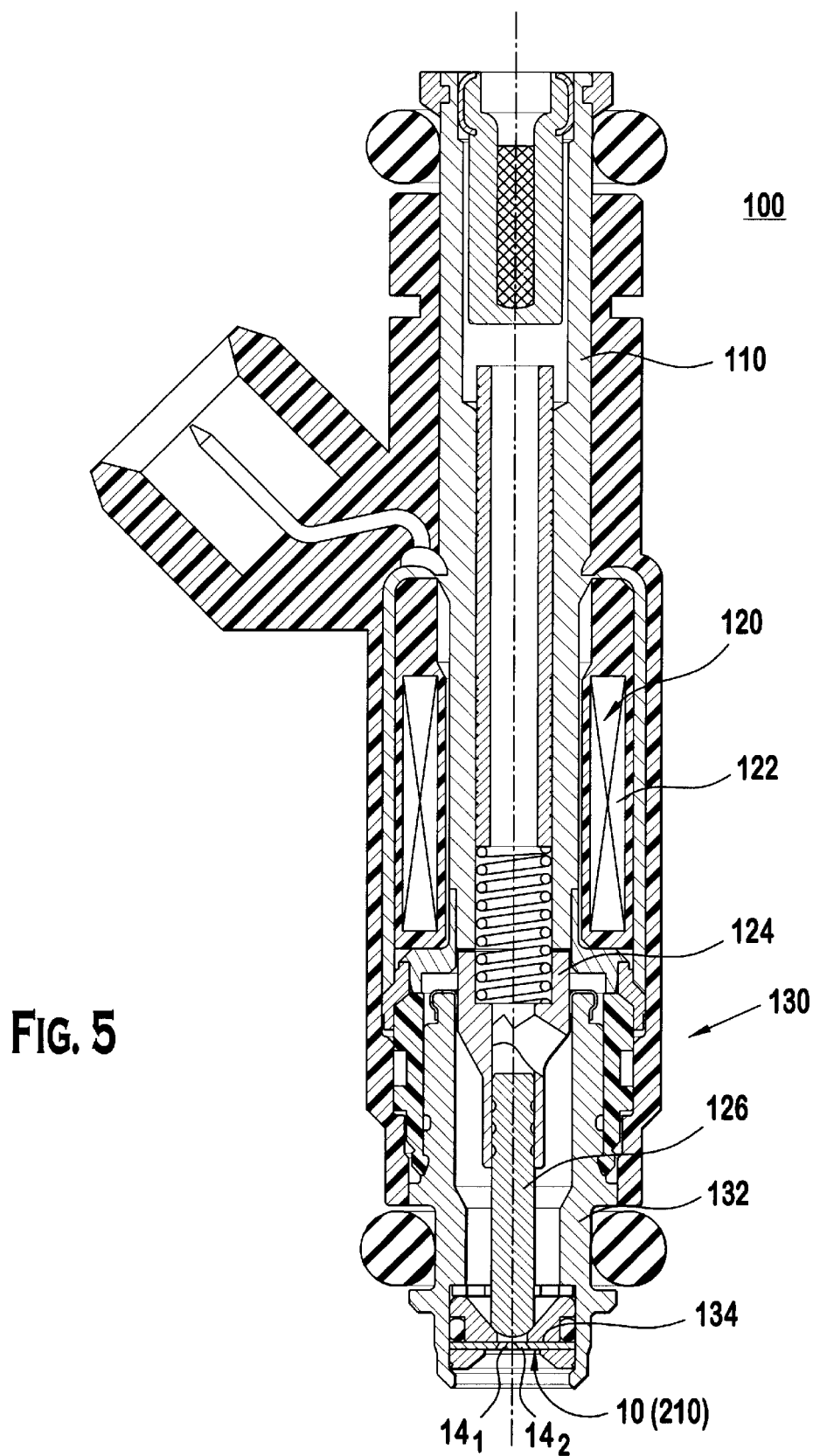
FIG. 5 illustrates the orifice plate and the angled orifice in a fuel injector.

Returning to FIGS. 4a–4d, as the orifice 12 (or 212) is formed in FIG. 4a, materials on the wall or orifice surfaces 12a and 12b are removed and sheared away, leaving behind generally parallel ridges or region 310 uniformly distributed about the circumferential surface of the orifice 12 or 212. As the orifice 14 (or 213) is formed, in FIG. 4b, materials of the wall or orifice surfaces are plastically deformed and cold worked (shown here as regions 310a and 310b) as the respective tool head cuts into the crystalline structure of the wall or orifice surfaces of the orifice. Since the tool heads are moved in opposite directions with respect to the orifice 12, a transition region 320 can be formed between a first area 318a bounded by partial sections of the plate surfaces 302a, 302b and line 316 and a second area 318a bounded by partial sections of surfaces 302a, 302b and line 318. The first bounded area 316a has surface characteristics oriented in a first direction due to the movement of the first tool head, which causes a change in the crystalline structure of the material of the orifice. To better illustrate the characteristics of the angled orifice, the orifice is unrolled in FIGS. 4d and 4e. That is, FIGS. 4d and 4e illustrate a 360 degrees panoramic view of the surfaces of the orifice as viewed by an observer rotating about the longitudinal axis A within the orifice. As seen in the "virtual" unrolling of the orifice 14 in FIGS. 4d and 4e, the second bounded area 318a has surface characteristics oriented in a second direction different from the first direction due to the movement of the second tool head, which also causes a change in the crystalline structures of the orifice plate. It should be noted that a crystalline structure of the transition region could be different from a crystalline structure of the first and second bounded areas. Similarly, the crystalline structure of the first bounded area can be different from that of the second bounded area. Although the first and second bounded areas 316a, 318a are shown as being bounded by partial sections of the surfaces 302a, 302b and two lines 316 and 318, in certain cases, depending on the geometries of the cutting tool(s) and other dimensional parameters of the orifice, the line 316 can merge with line 318 so as to define a single continuous line 322 between the two contiguous first and second areas in place of the transition region 320, shown here in FIG. 4e.

Thus, one of several methods of forming an angled orifice can be performed by punching the metal sheet 210 in a first direction along a first axis A perpendicular to one of the first and second surfaces 210a, 210b of the metal sheet with a first tool piece 200 so as to form a first orifice. The first orifice 12 defines an opening having wall surfaces 212a, 212b parallel to the first axis. This method is further performed by punching the metal sheet 210 with the first tool piece 200 proximate the first orifice 210 in the first direction along a second axis B parallel and offset to the first axis so as to form a first wall surface 213a of the first orifice 213 extending between the first and second surfaces of the metal sheet and being oblique to the first axis A. Further, the method is also performed by punching the metal sheet 210 with the first tool piece 200 or with a second tool piece 202 proximate the first orifice in a second direction along a third axis parallel C and offset to the first axis A so as form a second wall surface 213b of the first orifice oblique to the first axis A.

Another method of forming an angled orifice can also be performed by providing first and second tool heads 20a, 20b and a plurality of pre-formed orifices 12 extending between the first and second plate surfaces 10a, 10b along a longitudinal axis A. Each of the plurality of orifices has wall surfaces 12a, 12b parallel to the longitudinal axis A and intersecting the first and second plate surfaces 10a, 10b so as to define an edge of the orifice. This method is performed, in part, by moving one of the first tool head 20a and the plat 10 in a first direction along the longitudinal axis into one of the first a second plate surfaces 10a, 10b at a location proximate an edge (similar to edge 212c of FIG. 3c) of each of the plurality of orifices so as to cause a first portion of the wall surfaces to extend in a first oblique direction relative to the longitudinal axis A. Further, this method is performed, in part, by moving the other of the second tool head 20*b* and the plate 10 in a second direction along the longitudinal axis A into the other of the first and second plate surfaces 10*a*, 10*b* at a location proximate an edge of each of the plurality of orifices 12 so as to cause a second portion of the wall surfaces to extend in a second oblique direction relative to the longitudinal axis A. The moving feature of this method can further include moving one of the first tool head 20*a* and the plate 10 in a first direction during a first predetermined time interval t1 and moving in the second direction further comprises moving one of the second tool head and the plate in a second direction opposite to the first direction during a second predetermined time interval t2. In moving one of the first tool head and plate in a first direction, the method includes displacing the first portion of the wall surfaces of each of the plurality of orifices proximate one of the first and second surfaces in the first oblique direction to the longitudinal axis. In moving the other of the second tool head and plate, the method includes displacing the second portion of the wall surfaces 12*a*, 12*b* of each of the plurality of orifices proximate the other of the first and second plate surfaces 10*a*, 10*b* in the second oblique direction relative to the longitudinal axis A. The displacing can also include causing the one of the first and second portions of the wall surfaces 12*a*, 12*b* to deform such that the one portion is generally parallel to a narrowed portion of the first tool head 20*a*, and causing the other of the first and second portions of the wall surfaces to deform such that the other portion is generally parallel to a narrowed portion of the second tool head 20*b*.

Operations and further details of a fuel injector for which an orifice plate of a preferred embodiment can be employed is described in copending application Ser. No. 10/097,628 filed on even date as the instant application, which copending application is incorporated herein by reference in its entirety. The fuel injector, illustrated here in FIG. 5 as injector 100, includes an inlet tube 110, electromagnetic actuator 120 and a valve assembly 130. The electromagnetic actuator 120 can include an electromagnetic coil 122, an armature 124 and a closure member 126 coupled thereto. The valve assembly 130 can include a valve body 132, a valve seat 134 and an orifice plate 10 or metal sheet 210. A plurality of orifices $14_1$ and $14_2$ can be formed for the orifice plate 10 or metal sheet 210 in accordance with the preferred embodiments discussed above. Thereafter, the orifice plate can be assembled with other components of the fuel injector 100. Additional details are set forth in U.S. Pat. No. 5,494,225 issued on Feb. 27, 1996, which is incorporated in its entirety herein by reference.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A method of forming orifices in a metal sheet, each orifice having an oblique axis relative to at least one of a first surface and a second surface of a metal sheet, the method comprising:
    punching the metal sheet in a first direction along a first axis perpendicular to one of the first and second surfaces of the metal sheet with a first tool piece so as to form a first orifice, the first orifice defining an opening having wall surfaces parallel to the first axis; and
    punching the metal sheet with the first tool piece proximate the first orifice in the first direction along a second axis parallel and offset to the first axis so as to form a first wall surface of the first orifice extending between the first and second surfaces of the metal sheet oblique to the first axis.

2. The method of claim 1, further including punching the metal sheet with a second tool piece proximate the first orifice in a second direction along a third axis parallel and offset to the first axis so as form a second wall surface of the first orifice oblique to the first axis.

3. The method of claim 2, wherein the second wall surface is generally parallel to the first wall surface so as to form a second orifice.

4. The method of claim 3, wherein an area of the opening of the first orifice is less than an area of the opening of the second orifice.

5. The method of claim 3, wherein the first surface including a first region having a first surface characteristic being oriented in a first direction oblique to the longitudinal axis, the second surface including a second region having second surface characteristic being oriented in a second direction opposite the first direction.

6. The method of claim 5, wherein the first region is spaced from the second region by a transition region with a surface characteristic different from the first and second surface characteristics.

7. The method of claim 5, wherein the first region is contiguous to the second region such that a continuous line separates the first region from the second region.

8. The method of claim 5, wherein a material of the orifice proximate the first and second transition regions is cold worked and deformed by plastic deformations.

9. The method of claim 5, wherein the first and second tool heads are diametrical to each other such that each tool head is contiguous to a respective intersection between one of the first and second plate surfaces and one of the first and second surfaces of the orifice.

10. The method according to claim 5, wherein each of the tool heads comprises a pointed tip punch.

11. The method of claim 5, wherein the intersection proximate at least one of the first and second transition regions comprises a raised portion.

12. A method of forming a plurality of orifices for an orifice plate, the orifice plate having a first plate surface and a second plate surface spaced from the first plate surface, the method comprising:
    providing first and second tool heads and the orifice plate with a plurality of orifices extending between the first and second plate surfaces along a longitudinal axis, each of the plurality of orifices having wall surfaces parallel to the longitudinal axis and intersecting the first and second plate surfaces so as to define an edge of the orifice;
    moving one of the first tool head and the plate in a first direction generally along the longitudinal axis with an axis of the first tool head offset to the longitudinal axis into one of the first and second plate surfaces at a location proximate an edge of each of the plurality of orifices so as to cause a first portion of the wall surfaces to extend in a first oblique direction relative to the longitudinal axis; and
    moving the other of the second tool head and the plate in a second direction generally along the longitudinal axis with an axis of the second tool head offset to the longitudinal axis into the other of the first and second plate surfaces at a location proximate an edge of each of the plurality of orifices so as to cause a second portion of the wall surfaces to extend in a second oblique direction relative to the longitudinal axis.

13. The method according to claim 12, wherein the moving in the first direction further includes moving one of the first tool head and the plate in a first direction during a first predetermined time interval and moving in the second direction further comprises moving one of the second tool head and the plate in a second direction opposite to the first direction during a second predetermined time interval.

14. The method according to claim 13, wherein the first predetermined time interval overlaps the second predetermined time interval.

15. The method according to claim 13, wherein the first predetermined time interval does not overlap the second predetermined time interval.

16. The method according to claim 12, wherein the moving in the first direction comprises displacing the first portion of the wall surfaces of each of the plurality of orifices proximate one of the first and second surfaces in the first oblique direction to the longitudinal axis.

17. The method according to claim 16, wherein the moving in the second direction comprises displacing the second portion of the wall surfaces of each of the plurality of orifices proximate the other of the first and second plate surfaces in the second oblique direction relative to the longitudinal axis.

18. The method according to claim 17, wherein the displacing further comprises causing the one of the first and second portions of the wall surfaces to deform such that the one portion is generally parallel to a surface of the first tool head.

19. The method according to claim 18, wherein the displacing further comprises causing the other of the first and second portions of the wall surfaces to deform such that the other portion is generally parallel to a surface of the second tool head.

20. The method according to claim 19, wherein the displacing comprises causing one of the first and second plate surfaces to contact one of the first and second tool heads at a position on the surface contiguous to the edge of each of the plurality of orifices.

21. The method according to claim 17, wherein the displacing further comprises causing the other of the first and second plate surfaces to contact the other of the first and second tool heads at a position on the surface contiguous to the edge of each of the plurality of orifices.

22. The method according to claim 17, wherein the first portion of the wall surfaces extending in the first oblique direction is generally parallel to the second portion of the wall surfaces extending in the second oblique direction.

23. The method according to claim 17, wherein the first portion of the wall surfaces extending in the first oblique direction is generally non-parallel to the second portion of the wall surfaces extending in the second oblique direction.

24. The method of claim 12, wherein the first portion of the wall surfaces including a first region having a first surface characteristic being oriented in a first direction oblique to the longitudinal axis, the second portion of the wall surfaces including a second region having second surface characteristic being oriented in a second oblique direction opposite the first oblique direction.

25. The method of claim 24, wherein the first region is spaced from the second region by a transition region with a surface characteristic different from the first and second surface characteristics.

26. The method of claim 24, wherein the first region is contiguous to the second region such that a continuous line separates the first region from the second region.

27. The method of claim 24, wherein a material of the orifice proximate the first and second transition regions is cold worked and deformed by plastic deformations.

28. The method of claim 24, wherein each of the tool heads comprises a pointed tip punch.

29. The method of claim 24, wherein an intersection of one of the first and second plate surfaces and the wall surfaces proximate at least one of the first and second transition regions comprises a raised portion.

30. The method of claim 12, wherein the moving of the one of the first tool head and the plate and the moving of the other of the second tool head and the plate in the respective first and second directions comprise contacting a tip of each tool head on the edge of the orifice.

* * * * *